(12) United States Patent
Vayssiere

(10) Patent No.: US 7,587,385 B2
(45) Date of Patent: Sep. 8, 2009

(54) AUTOCOMPLETION FOR UNORDERED LISTS

(75) Inventor: Julien J. P. Vayssiere, Queensland (AU)

(73) Assignee: SAP AG, Walldorf (DE)

( * ) Notice: Subject to any disclaimer, the term of this patent is extended or adjusted under 35 U.S.C. 154(b) by 248 days.

(21) Appl. No.: 11/215,717

(22) Filed: Aug. 30, 2005

(65) Prior Publication Data
US 2007/0050728 A1  Mar. 1, 2007

(51) Int. Cl.
G06F 17/30 (2006.01)
(52) U.S. Cl. ............. 707/2; 707/1; 707/3; 707/4; 707/10; 707/100
(58) Field of Classification Search ........... 707/1–10, 707/100, 102, 104
See application file for complete search history.

(56) References Cited

U.S. PATENT DOCUMENTS

| | | | |
|---|---|---|---|
| 6,208,339 B1 | 3/2001 | Atlas et al. | |
| 6,377,965 B1* | 4/2002 | Hachamovitch et al. | 715/203 |
| 6,539,421 B1 | 3/2003 | Appelman et al. | |
| 6,564,213 B1 | 5/2003 | Ortega et al. | |
| 6,829,607 B1 | 12/2004 | Tafoya et al. | |
| 7,167,585 B2* | 1/2007 | Gounares et al. | 382/187 |
| 2004/0039988 A1 | 2/2004 | Lee et al. | |
| 2004/0230987 A1 | 11/2004 | Snover et al. | |
| 2004/0236736 A1* | 11/2004 | Whitman et al. | 707/3 |
| 2004/0254928 A1 | 12/2004 | Vronay et al. | |
| 2006/0004739 A1* | 1/2006 | Anthony et al. | 707/4 |
| 2006/0195461 A1* | 8/2006 | Lo et al. | 707/100 |
| 2006/0224553 A1* | 10/2006 | Chtcherbatchenko et al. | 707/1 |
| 2006/0242109 A1* | 10/2006 | Pereira et al. | 707/1 |
| 2008/0065617 A1* | 3/2008 | Burke et al. | 707/5 |

OTHER PUBLICATIONS

"del.icio.us/about", login register about popular, http://del.icio.us/doc/about printed on Aug. 26, 2005,4 pages.
"Google Suggest: Frequently Asked Questions", http://labs.goggle.com//suggestfaq.html, Printed on Aug. 26, 2005, 3 pages.
Bukukkokten, Orkut , et al., "Focused Web Searching with PDAs", http://www9.org/w9cdrom/195/195.htmo, Printed on Aug. 26, 2005, 25 pages.
Jakobsson, Matti, "Autocompletion in Full Text Transaction Entry: A Method for Humanized Input", *Conference Proceedings on Human Factors in Computing Systems*, (Apr. 1986),327-332.

* cited by examiner

Primary Examiner—Cam-Linh Nguyen
(74) Attorney, Agent, or Firm—Brake Hughes Bellermann LLP

(57) ABSTRACT

Autocompletion techniques are described that allow a user to access previous entries to one or more data input fields, simply by typing in a desired term and/or character sequence at one of the data input fields. For example, an autocompletion system may match a current input sequence against words contained within the previous entries, where the current input sequence may not be included in a first word of some or all of the previous entries. In this way, the user may quickly and easily remember, access, and enter previous entries, or variations thereof, into a local input field.

20 Claims, 6 Drawing Sheets

400

AUTOCOMPLETION FOR UNORDERED LISTS

TECHNICAL FIELD

This description relates to autocompletion techniques.

BACKGROUND

User interfaces may include autocompletion features. For example, when a user types some text into a text entry field, the user interface may propose a list of possible text completions. Proposals for the possible completions may be based on, for example, text typed in so far, previous entries into the same field, or an indexing of related words (e.g., other words on a web page). The user may then select within a list of the proposals, by, for example, using a mouse or arrow keys, and pressing the enter key for validation.

For example, a user may have previously visited a news web site, using a conventional web browser, and may have entered the queries "real estate" and "Real Madrid." The next time the user starts to type the characters "real" into the same text entry field, the browser may propose the two possible completions "real estate" and "Real Madrid," usually using a small choice list that pops up right below the text entry field. The user may then choose one of the proposed completions, or keep typing if none of the proposed completions matches the text that the user intends to type into the text field. The latter example may occur, for example, where the user intended to type in the phrase "Real Player."

SUMMARY

According to one general aspect, an input character sequence is received at an input field. A first previous entry is determined that includes both the input character sequence and at least a first previous character sequence in an order in which the first previous character sequence precedes the input character sequence, and the first previous entry is provided in association with the input field.

According to another general aspect, a system includes a field history database that is operable to store a plurality of previous entries to at least one input field, and a completion list generator that is operable to receive an input character sequence from a current input field and select a previous entry from the plurality of previous entries, the previous entry including the input character sequence after at least one other character sequence. The completion list generator is further operable to present the previous entry in a completion list.

According to another general aspect, an apparatus includes a storage medium having instructions stored thereon. The instructions include a first code segment for receiving an input character sequence at an input field, a second code segment for determining a previous entry from a plurality of previous entries, the previous entry including the input character sequence and at least one previous character entry in an ordered sequence in which the previous character entry precedes the input character sequence, and a third code segment for presenting a completion list that includes the previous entry.

The details of one or more implementations are set forth in the accompanying drawings and the description below. Other features will be apparent from the description and drawings, and from the claims.

DETAILED DESCRIPTION

Figure 1:
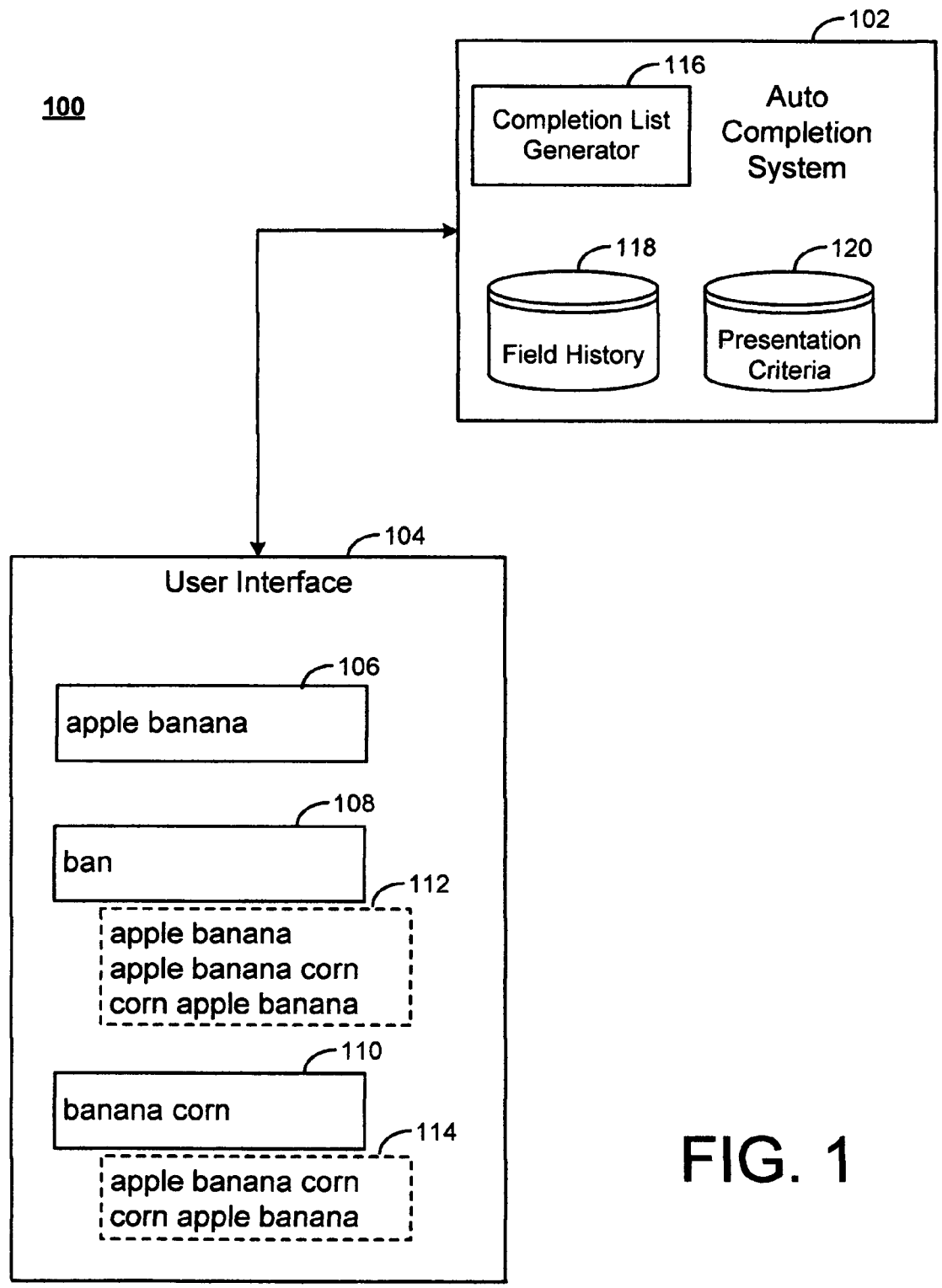
FIG. 1 is a block diagram of a system for providing suggestions to users for completing a data entry.

FIG. 1 is a block diagram of a system 100 for providing suggestions to users for completing a data entry. In FIG. 1, an autocompletion system 102 communicates with a user interface 104, in order to provide suggestions to a user of the user interface 104, as the user enters text or other input into the user interface 104.

The user interface 104 may include any user interface into which a user may enter data, including Internet/web browsers, stand-alone applications, or client applications in a client-server context. In particular, these and other type of user interfaces may expect the user to enter a set of space-separated words. For example, this may be the case when the user enters a list of keywords for indexing a document into a content management system.

Although not illustrated in FIG. 1, it should be understood that the autocompletion system 102 and/or user interface 104 may be implemented in virtually any type of computing device that has a display and/or output channel of some kind, including, for example, a desktop computer, a laptop computer, a personal digital assistant (PDA), a digital video recorder (DVR) or digital media center (as may be used with a television), or a tablet computer. Additionally, the autocompletion system 102 and/or the user interface 104 may be operated on any one of these, or others, or on a combination of two or more of these. For example, the autocompletion system 102 may be operated locally at a browser displaying the user interface 104, or may be operating on a remote server.

The user interface 104 includes input fields 106, 108, and/or 110, into which the user may enter, for example, an input character sequence or other data, where such information may be displayed within the input field 106 in a particular order or sequence, e.g., the order in which it was entered by the user or another user. Such a character sequence or other data may include, for example, one or more keywords, a string of letters that represent the beginning of a word or words to be entered, or other types of data, including image and/or audio data.

Data may be input into the input fields 106, 108, and/or 110 using virtually any known method, including, for example, the use of a mouse/keyboard, voice recognition software, or the use of a stylus or touchpad (e.g., in the context of a PDA). Although FIG. 1 illustrates the input fields 106, 108, and/or 110 as being displayed within the single user interface 104, it should be understood that any of the input fields 106, 108, and/or 110 may each be included in one or more other user interface. Also, although FIG. 1 illustrates the input fields 106, 108, and/or 110 being displayed simultaneously, it should be understood that any one of the input fields 106, 108, and/or 110 may be displayed at a first time, perhaps displaying a first character sequence, while any one of the other of the input fields 106, 108, and/or 110 may be displayed at a second time, perhaps displaying the same or different character sequence, and/or selected for receiving a new character sequence.

In the example of FIG. 1, the input field 106 has received a phrase, "apple banana." At a future time, the input field 108 receives a first character sequence of "ban," e.g., as the user is in the process of entering the word "banana." In this case, as shown, the autocompletion system 102 provides a completion list 112 in association with the input field 108, in order to provide suggestions of previous entries from which the user may select for completing the entry into the input field 108.

In particular, the autocompletion system 102 provides suggestions in the completion list 112 in which the keyword "banana" appears in a position other than a first position within the provided list of previous entries. For example, as explained in more detail herein, the autocompletion system 102 has registered the previous entry of "apple banana" within the input field 106, and includes this entry within the suggested completion list 112. The autocompletion system 102 also provides two other entries "apple banana corn," and "corn apple banana," which may have, for example, been entered into one or more of the input fields 106, 108, and/or 110, or into some other input field in a different user interface, at some previous time.

In this way, the autocompletion system 102 is operable to provide suggestions to the user based on any previous entry, so that, for example, the user may find any particular previous entry, just by typing (or beginning to type) any word within any of the previous entries. As illustrated, the input character sequence "ban" does not have to have been included as a first word of any of the previous entries within the suggested completion list 112, although such a previous entry also would be detected and provided by the autocompletion list, if present/available.

For example, the user interface 104 may represent an interface for a search engine, in which users enter search data into input fields for the purpose of finding information related to the search data. Thus, perhaps the user entered the phrase "apple banana" into the input field 106 as part of such a search for information containing these two terms, and obtained favorable results. In this case, the phrase "apple banana" may have been entered into the field 106 at some previous time. At a present time, then, the user may have forgotten the exact phrase, but may want to replicate the search to re-obtain the favorable results. Using the autocompletion system 102, the user need only remember that the search included the term "banana" in order to replicate the previous entry "apple banana," even though the term "banana" was not the first word of the previous entry.

In FIG. 1, the previous entry "apple banana" is thus replicated exactly as that term was entered by a user, even though the user is now beginning with the sequence "ban." Such an implementation may assist a user in remembering or otherwise recognizing a specific, previous search. In other implementations, however, the element (e.g., words) of the previous entry "apple banana" may be re-arranged so that the currently-entered term is listed first, in which case the completion list 112 would present, for example, the terms, "banana apple," "banana apple corn," and "banana corn apple." For example, a search to be performed using the "AND" operator may not recognize the difference between the representations of the previous term(s) "apple banana" and "banana apple," in which case the completion list 112 may present that previous entry either way, and/or according to a user preference.

Thus, in cases where the order of items does not matter, or only matters to a limited extent (e.g., for certain pairs or groups of words), then the suggested completions may be re-ordered for presentation in the completion list(s) 112/114, as just described. In other implementations, entries within the various input fields 106, 108, and/or 110 may be maintained just as they were originally entered at the respective fields. Such implementations may be suited for cases where a single or small group of users may wish to remember previous entries, as they were originally entered.

Further, at the input field 110, the user may enter two terms "banana corn." In this case, the autocompletion system 102 may provide a suggested completion list 114 of previous entries that include both terms, even if the terms are in a different order within the previous entries. That is, the completion list 114 includes the entries "apple banana corn" and "corn apple banana," even though neither of these suggestions begin with the same character sequence as the term(s) entered into the field 110.

It should be noted that the suggested completion list 114 does not include the previous entry "apple banana" from the list 112, since that entry contains the term "banana" but does not contain the term "corn." In other implementations, the autocompletion system 102 may consider multi-part input sequences as a whole (e.g., may consider the phrase "banana corn" as a single unit), and may only include such sequences in the suggested completion list 114 (e.g., in this case, if "banana corn" were considered as a unit, then only the entry "apple banana corn" would appear within the list 114). Such implementations may operate in response to user designation (e.g., by enclosing a phrase of two or more words in quotes), or may operate with some degree of automation (e.g., providing grouped terms "real estate," and/or "Real Madrid" whenever the term "real" is entered).

In other implementations, the autocompletion system 102 may provide suggested completion lists including a plurality of words for a given input character sequence (where available). For example, where the input character sequence is "ban," as above, the autocompletion system 102 may provide all previous entries that include "banana," "bank," or any other word that begins with the sequence "ban." Again, such previous entries may be provided even where the relevant terms (e.g., "banana," or "bank") are not the first word(s) in those previous entries.

In the example of FIG. 1, the autocompletion system 102 includes a completion list generator 116 that analyzes the input character sequence(s) and accesses one or more databases 118 that include a history of previous entries to the given field(s). In this way, the completion list generator 116 may provide the completion lists 112 and/or 114, in the manner(s) described herein.

In providing the completion lists 112 and/or 114, the completion list generator 116 may do so according to presentation criteria in one or more databases 120. Such presentation criteria may determine, for example, a number or order of the previous entries from the field history database 118 to be included in the completion lists 112/114. For example, the completion lists 112/114 may be limited to some maximum number of results, or may be sorted or filtered according to some factor(s). For example, entries in the completion lists 112/114 may be sorted from fewest terms to most terms (or vice versa), or entries having certain terms may be removed, or entries that have been entered into one or more of the data input fields 106, 108, and/or 110 with a highest frequency may be included to the exclusion of lower-frequency entries.

Some or all of the presentation criteria 120 may be determined by way of a preference of the user, and may be tracked with respect to specific users and/or specific ones or types of the user interface 104. Also, in a case where a number of entries in the completion list(s) 112/114 exceed a space available to a window or other area for presenting the completion list(s) 112/114, a scroll bar or other mechanism may be provided to allow the user to view a larger number of entries within completion list(s) 112/114.

Once the completion lists 112/114 are presented, the user may select one of the entries by, for example, using a mouse and/or keyboard to highlight a desired term. Then, the original data input field, e.g., the input field 108 containing the term "ban," may be automatically completed (i.e., filled in) with the selected entry. In this way, the user may be required to perform a reduced amount of typing (or other data entry), which may be particularly useful for, for example, the case of a small and/or mobile device that does not have a full-sized keyboard, or in a case where the user has a physical handicap or other limitation that makes typing (or other data entry) difficult. Further, a memory of the user may be refreshed in cases where, for example, the user may have entered the previous entries at some earlier time, as referred to above, and may have since forgotten the exact data entry that was previously entered.

As referenced above, and described in more detail below, the auto completion system 102 may be located and implemented locally to the user interface 104, rather than, for example, operating at a remote server that is operable to receive data entries into the input fields 106, 108 and/or 110 over a network. As a result, in these implementations, the autocompletion system 102 may be operable to easily track entries of one or more users of the interface 104, and may therefore provide fast and highly-personalized results within the completion list(s) 112/114. In addition, since the autocompletion system 102 runs locally in these implementations and may be limited from communicating with external servers, the autocompletion system 102 presents little or no concern to users with respect to a privacy of the users, i.e., does not make previous entries of the users available to other parties.

In the implementations of FIG. 1, the user interface 104 may include the interface of a search engine (as referenced above), or may include virtually any other user interface that may include input fields for data entry. For example, the user interface 104 may include data input fields for receiving user information including, for example, the user's name or address, credit card information, email addresses, and any other information that may be entered by the user(s).

In implementations of the system 100 of FIG. 1, the autocompletion system 102 may or may not consider an order of individual entries within the input fields 106, 108, and/or 110 and/or within the completion list(s) 112/114, when receiving or presenting entries, respectively. For example, as referred to above, the phrase "banana corn" in the field 110 may be considered to be in a required order, so that, in these implementations, only the suggested completion entry "apple banana corn" may be supplied in the completion list 114 (not explicitly shown in FIG. 1).

Figure 2:
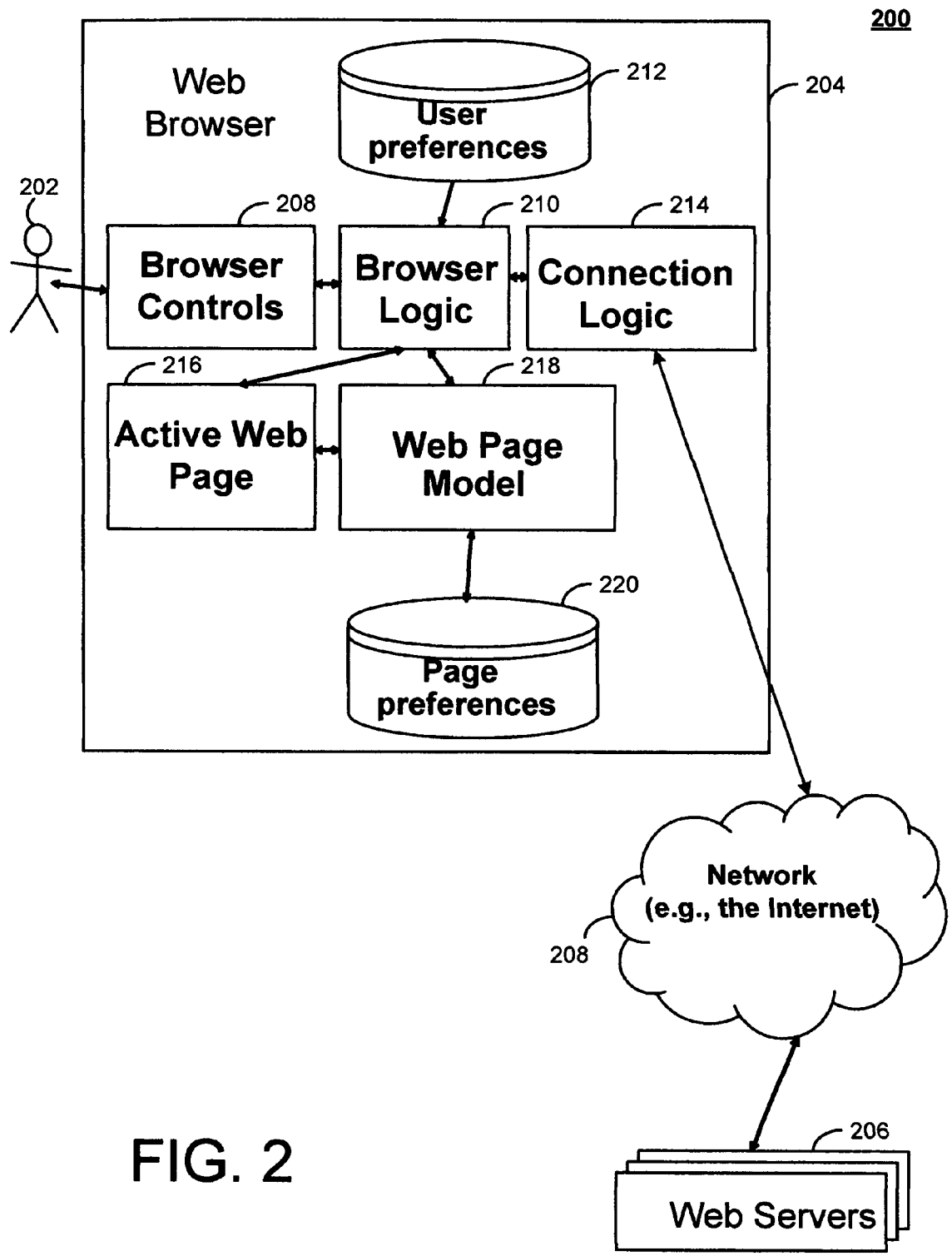
FIG. 2 is a block diagram of a system for accessing remote content.

FIG. 2 is a block diagram of a system 200 for accessing remote content. In FIG. 2, a user 202 uses a web browser 204 to connect to a network 208 (e.g., the Internet), and thereby to connect to one or more web servers 206 that contain content desired for viewing and/or access by the user 202.

As described above, the browser 204 is an example of the user interface 104 that may benefit from the autocompletion system 102. For example, the user 202 may use the browser 204 to access a search engine or shopping site that is located on one of the servers 206, and may benefit from the autocompletion features described herein when performing a search or making a purchase.

The web browser 204 includes browser controls 208, which generally represent controls associated with the browser 204 that are not specific to any particular page or other content being displayed by the browser 204 at any particular time. Such browser controls 208 may include, for example, a menu bar, a tool bar, a back button, a forward button, and other common buttons and other controls typically associated with browser usage.

Browser logic 210 generally represents software that controls a manner in which the web browser 204 operates and responds to the browser controls 208. For example, the browser logic 210 may be responsible for opening new pages, creating new windows, applying user preferences, or any other task that may be initiated by the user 202 using the browser controls 208.

User preferences 212 refer to any user-specific settings that may be stored in association with the browser 204. Such settings may refer, for example, to preferred font sizes, a desired start page, and other conventional features. The user preferences 212 also may refer to preferences of the user 202 with respect to the autocompletion system 102, as described herein.

Connection logic 214 includes software responsible for connecting to the Internet 208. The connection logic 214 may include, for example, software for opening and managing connections to the web servers 206, as well as working with other external systems, such as, for example, Hyper-Text Transfer Protocol (HTTP) proxy servers.

An active web page 216 refers to an actual graphical user interface component used for displaying a given web page or other content. The active web page 216 contains controls specific to a given web page, such as included hypertext links, push buttons, radio buttons, text fields, choice lists, and other items on the specific page that may require control/input.

Thus display elements and control elements of the active web page 216 interact with a web page model 218 for obtaining information on what to display, and how to display it. The web page model 218 refers to an in-memory software object that represents a web page that the user 202 has selected for viewing. The web page model 218 contains information derived from the source code for the currently-displayed page, as well as, for example, information from previous visits to the same page or to the same web site.

Such information may include, for example, cookies and previous entries to text fields in the page. Accordingly, a page preferences memory 220 may be in communication with the web page model 218 and used for persistent storage of such information.

Figure 3:
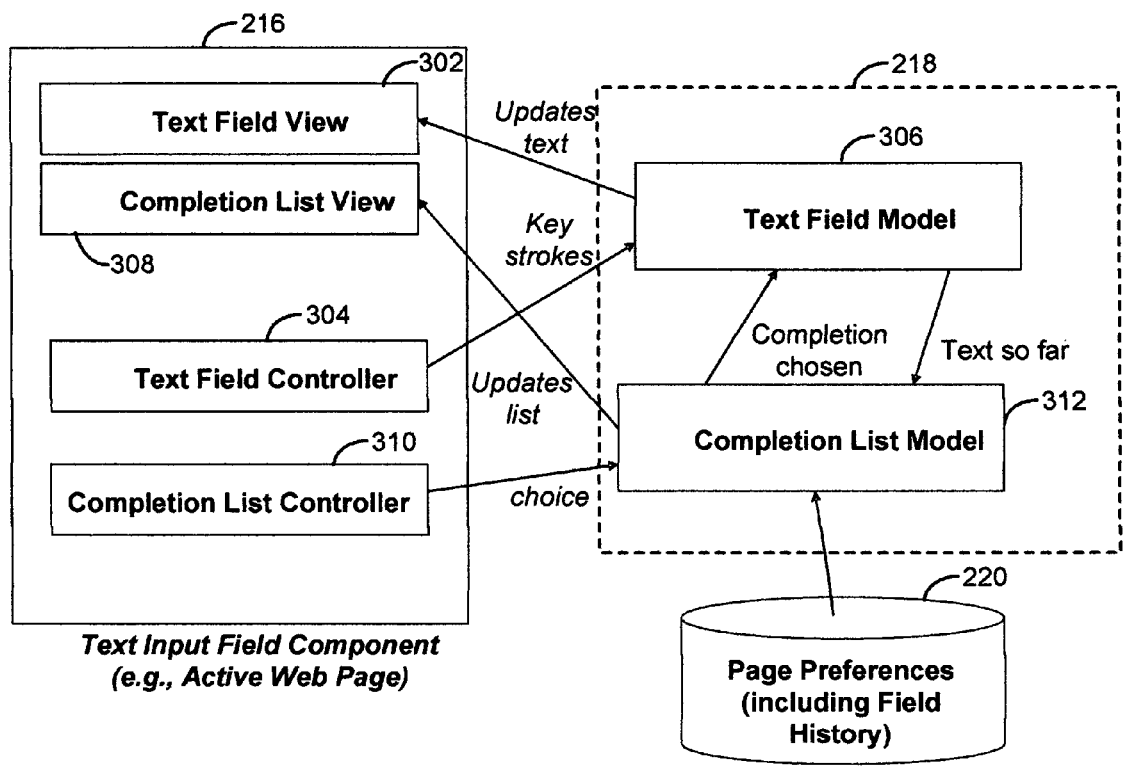
FIG. 3 is a block diagram of the autocompletion system of FIG. 1, as implemented in one implementation of the system of FIG. 2.

As a result, the active web page 216, the web page model 218, and/or the page preferences memory 220 may be used to implement the user interface 104 and the autocompletion system 102 of FIG. 1, as described in more detail herein, and, in particular, with respect to FIG. 3.

FIG. 3 is a block diagram 300 of the autocompletion system 102 of FIG. 1, as implemented in one implementation of the system 200 of FIG. 2. In particular, FIG. 3 illustrates a detailed view of one implementation of the active web page 216, web page model 218, and page preferences 220 of FIG. 2.

The diagram 300 illustrates a "Model-View-Controller" software/architecture design (implicitly referenced in the diagram 200 of FIG. 2), in which input, processing, and output roles may be mapped into a user interface setting. In this design, generally speaking, a "controller" element interprets user inputs (e.g., mouse and/or keyboard inputs, including clicking on a button or selecting a hyperlink) and maps these inputs into commands that are sent to a model to implement the desired change. The "model" manages one or more data elements, and responds to queries or instructions to change state. A "view" manages an area of the display of the user interface, and is responsible for presenting data to the user through a combination of graphics and/or text.

Thus, controller components generally have a view counterpart. In the case of a button, for example, the view is responsible for drawing the actual button. When the user 202 clicks on the button, the event is received by the button control component, which notifies the web page model 218 with the appropriate event. The web page model 218 will then update the appearance of the button by telling the view to change its appearance to that of a lowered button.

In FIG. 3, then, a text field view 302 represents a view of an entered and/or presented sequence of characters, such as, for example, the sequence "ban" of the input field 108 of FIG. 1. A text field controller 304 determines user actions associated with the text field view 302 (e.g., data entry by the user 202 when the focus in on the input field 108), and sends events related to these actions (e.g., keystrokes) to a text field model 306. The text field model 306 within the more general web page model 218 receives the events and sends instructions for updating the text field view 302 with information to display, such as, for example, text sequences, or, more generally, images, audio, or other information (e.g., by appending a character at the end of text being entered as a new character is typed into the input field 108).

A completion list view 308 refers to a display component that displays the list of proposed completions, e.g., the completions list(s) 112/114 of FIG. 1. As described above with respect to FIG. 1, the completion list view 308 may appear, for example, as a small pop-up display right below the corresponding text entry field, or, of course, may appear at other designated portions of a relevant user interface, such as, for example, in a dedicated sub-portion of the user interface that is maintained along a top, bottom, or side portion of the user interface.

A completion list controller 310 monitors actions performed by the user 202 on the completion list view 308. For example, the completion list controller 310 may notify a completion list model 312 when, for example, the user 202 has selected one of the proposed completions (e.g., by either clicking on one of the proposed completions, or hitting the return key while a desired selection is highlighted).

Thus, the completion list model 312 includes software that controls what appears in the completion list view 308. The completion list model 312 uses information including, for example, previous entries to the same or different input field (s), as well as any text typed in so far, in order to determine a list of possible completions. As should be understood from the above description, previous entries may be stored in the page preferences memory 220, which may include information overlapping with that of the field history memory 118.

The completion list model 312 receives from the text field model 306 a current state of the text typed in, as shown, and tells the text field model 306 when the user 202 has chosen a completion from the completion list view 308. The text field model 306 may then use this information to update an output of the text field view 302.

Figure 4:
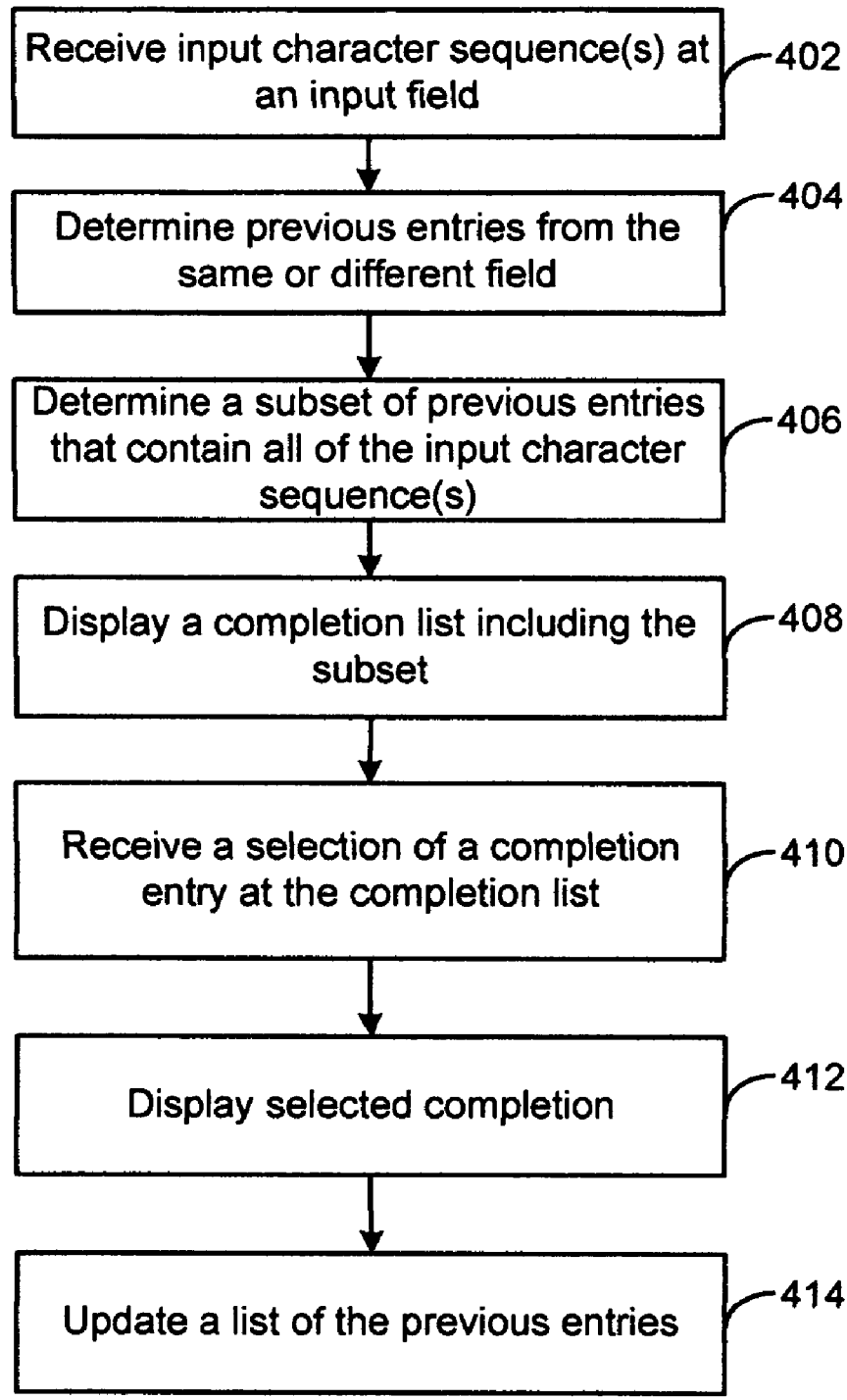
FIG. 4 is a flowchart illustrating operations of the systems of FIGS. 1-3.

FIG. 4 is a flowchart 400 illustrating operations of the systems 100, 200, and/or 300 of FIGS. 1-3. In FIG. 4, an input character sequence(s) is received at an input field (402). For example, the input character sequence "ban" may be received at the input field 108, and/or an analogous text sequence may be received at a text field view 302 of FIG. 3.

In the latter example, the text field controller 304 may update the text field model 306 based on received keystrokes, and the text field model 306 may accordingly provide a "text so far" event to the completion list model 312 to signify that the user 202 has modified text typed into the text field view 302.

Then, previous entries from the same or different input field(s) are determined (404). The completion list model 312 may, for example, extract (possible) keywords from the entered text, by, for example, making the assumption that keywords are separated by blank spaces.

Once the previous entries have been accessed, a subset of the previous entries that contain the input character sequence (s) may be determined (406). For example, the completion list model 312 may access the page preference 220/field history 118 information to find such a subset defined as including (all) previous entries that contain all of the elements in the set of keywords. As reference above, and described in more detail below, a desired sorting, ordering, or filtering of the subset may be performed, as well.

Then, a completion list including the subset may be displayed or otherwise provided (408). For example, the completion list(s) 112/114 may be displayed in the user interface 104 in association with the input fields 108/110, respectively. As another example, the completion list view 308 may be provided in association with the text field view 302. As the input character sequence(s) is typed in, such a list display(s) may, for example, highlight the keywords already typed in by displaying them in italics or bold face.

Accordingly, a selection of a completion entry may be received at the completion list (410). For example, the completion list view 308 may receive a selection from the completion list, so that the completion list controller 310 may then send a "choice" event to the completion list model 312.

The selected completion may then be displayed (412). For example, the completion list model 312 may transmit the selected completion to the text field model 306 by sending a "completion chosen" event, as illustrated in FIG. 3, and the text field model 306 may then update a text of the text field view 302. Analogously, the completion list generator of FIG. 1 may update the input field 108 with a selected previous entry of, for example, "apple banana." Accordingly, the user 202 may obtain a completion of the text field view 302, without having to enter (type in) the full entry, and without having to accurately and/or completely remember contents of the previous entry.

Finally in FIG. 4, the completion list model 312 may update the preference pages 220/field history 118, in order to reflect any necessary information that may be determined from the operations just described. For example, a selection of the user may be used to update a sorting or filtering mechanism of the completion list model 312, where, for example, completion list results are sorted by a frequency of selection of the various previous entries from the completion list.

Of course, the user 202 may not select a completion from the completion list, and may merely finish typing in a desired text sequence that has not previously been entered for storing in the field history 118. In this case, the text field model 306 and/or the completion list model 312 may add the newly-received text entry into the field history memory 118.

Figure 5:
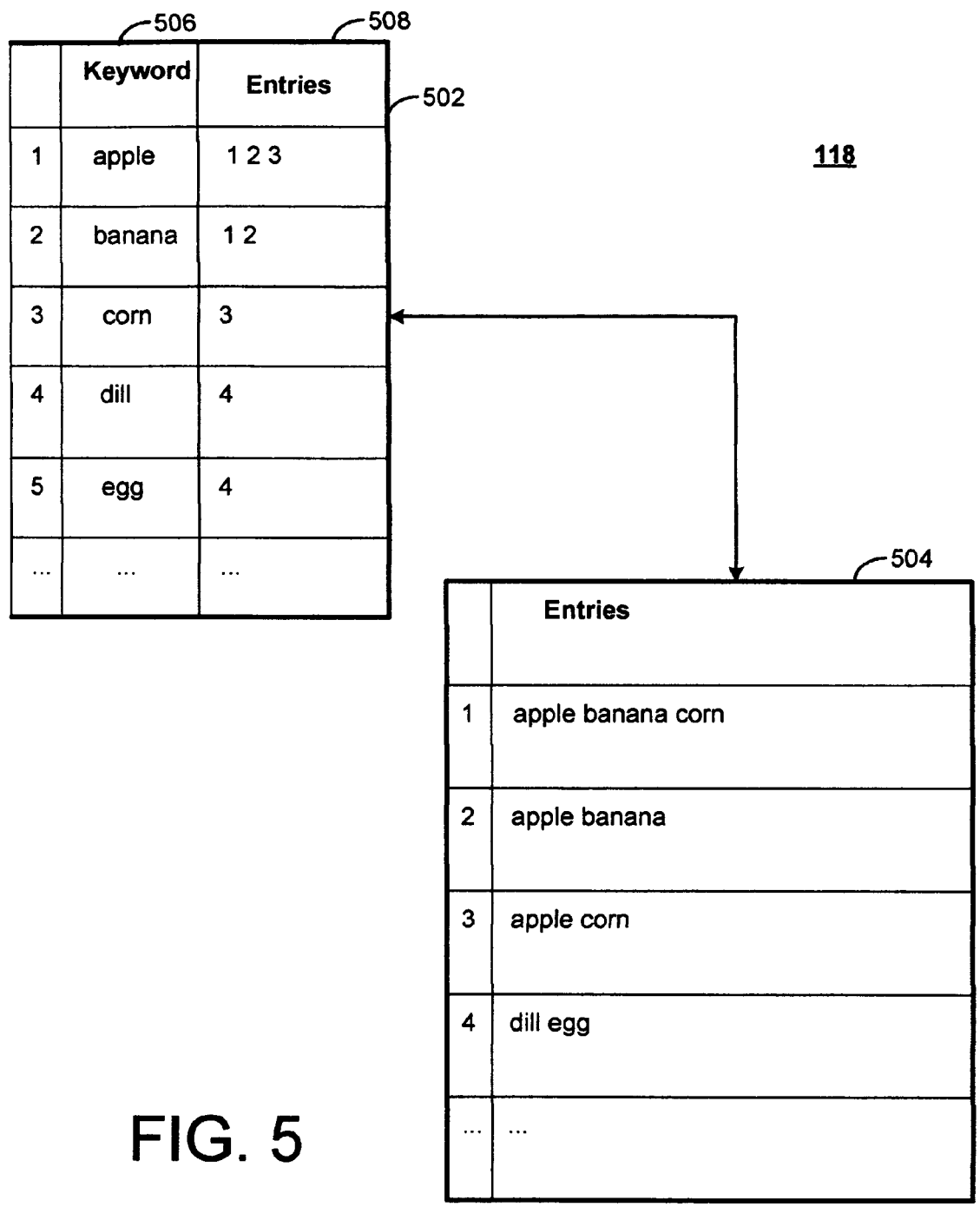
FIG. 5 illustrates tables for implementing a field history memory.

FIG. 5 illustrates tables 502 and 504 for implementing the field history memory 118 of FIG. 1 and/or relevant portions of the page preferences 220 of FIGS. 2 and 3. FIG. 5 is discussed with reference to FIG. 6, which is a flowchart 600 illustrating a use of the tables 502 and 504 of FIG. 5 within operations of the systems 100, 200, and/or 300 of FIGS. 1-3.

In FIG. 5, the field history 118 is illustrated as containing the two tables 502 and 504. In this example, the term tables may refer to, for example, tables in a relational database. However, the field history 118 may be implemented using other storage/access schemes.

The keywords table 502 uses keywords as its primary key (s). Specifically, for each keyword in a column 506, the keywords table 502 contains a list of entries in which the keyword appears within a column 508. The entries are actually references to the second table, or the entries table 504. That is, the table 504 contains a full listing(s) of the previous entries in which the keyword(s) appear.

Figure 6:
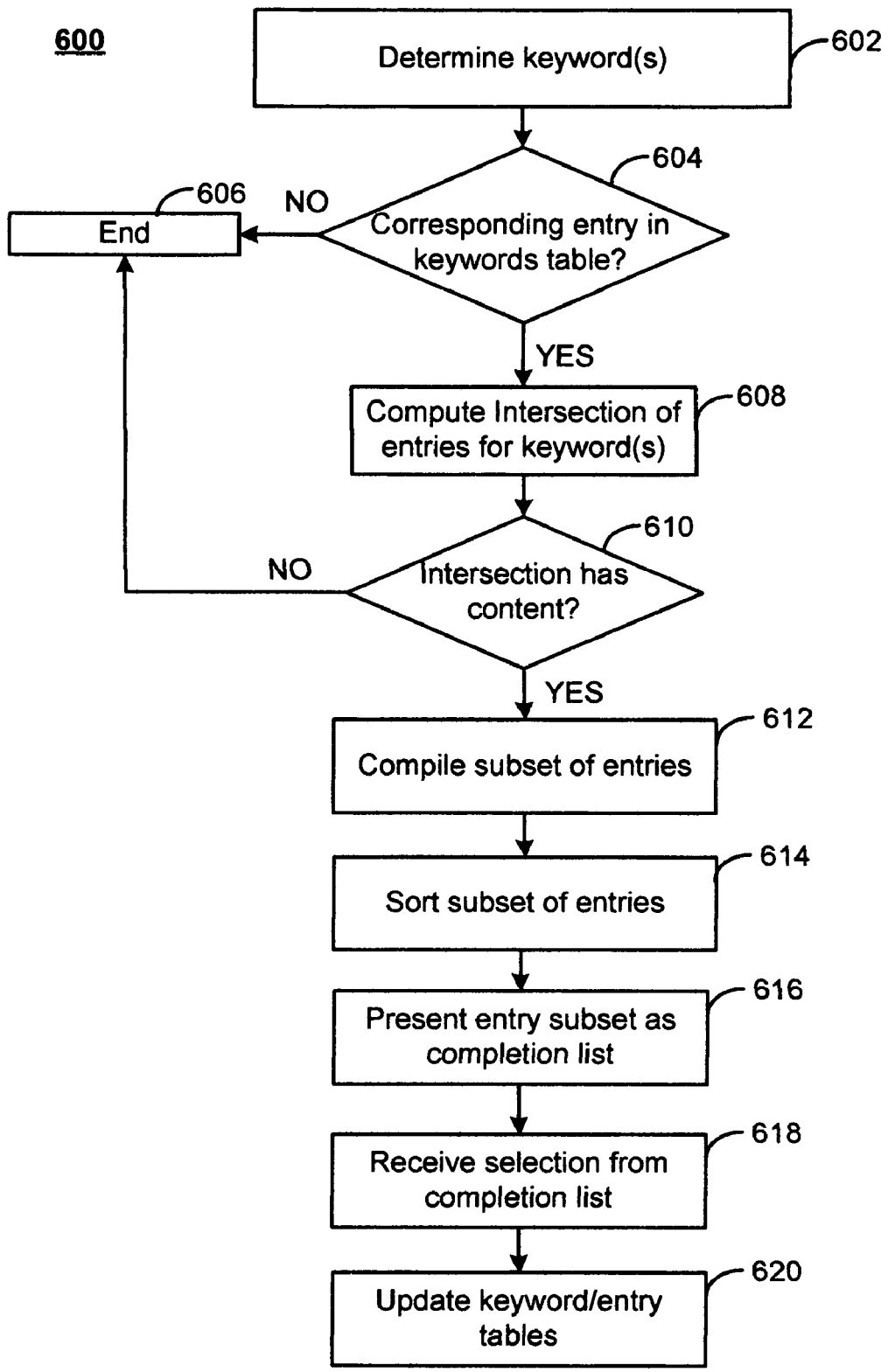
FIG. 6 is a flowchart illustrating a use of the tables of FIG. 5 within operations of the systems of FIGS. 1-3.

Thus, in FIG. 6, the process 600 begins with a determination of the keyword(s) (602), e.g., from an appropriate input field. Then, it is determined whether there is a corresponding entry listed in the column 508 for the particular keyword from the column 506 (604). If not, then the process ends (606), i.e., no completion list is generated.

Otherwise, an intersection of the entries for the keyword(s) is computed (608). For example, if the keyword is "banana," then the entry numbers "1" and "2" in the column 508 are generated, and intersected with corresponding entries from the table 504, i.e., "apple banana corn" and "apple banana."

If such an intersection is empty and has no content (610), then, again, the process ends (606). In the example just given, however, where the intersection is not empty, then a subset of entries representing the intersection (e.g., the entries "1" and "2" represent a subset of the entries "1," "2," "3," and "4" shown in FIG. 5) is compiled (612), and then sorted, ordered, and/or filtered (614). For example, the entries may be sorted according to some sorting rule. For instance, entries with the lowest number of keywords may be ordered first within a completion list. As another example, if a number within the subset of entries is above a certain threshold, then the list may be cut to retain only N (for example, 20) entries.

As another example, the resulting completion list may be sorted according to some criterion (e.g., the presentation criteria 120 of FIG. 1). For example, the completion list may be sorted based a counter added as an extension to the entries table 504 for each entry "1"-"4," in order, for example, to keep a count of how many times the associated entry has been used in the past.

Then, the subset of entries from the entries table 504 may be presented within a (sorted, ordered, and/or filtered) completion list (616), as in the various examples above, and a selection from the list may be received (618). For example, the user 202 may select from the completion list by highlighting or otherwise selecting one of the presented completions (entries). As already mentioned, although not specifically illustrated in FIG. 6, the user 202 also may type in an entirely new expression in order to complete an entry to an appropriate input field.

Finally in FIG. 6, the received entry at the input field may result in an updating of the two tables 502/504 (620). For example, if a new entry has been received at the input field, then the entries table 504 may be updated to include the new entry along with a reference number, e.g., "5," which would then be used as a key in the column 508 of table 502 for any word in column 506 that is included in the entry.

Autocompletion techniques are described herein that allow a user to access previous entries to one or more data input fields, simply by typing in a desired term and/or character sequence at one of the data input fields. For example, an autocompletion system may match a current input sequence against words contained within the previous entries, where the current input sequence may not be included in a first word of some or all of the previous entries. In this way, the user may quickly and easily remember, access, and enter previous entries, or variations thereof, into a local input field.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
receiving an input character sequence of a keyword at an input field of a client application running on a local computing device;
determining a first previous entry from a memory associated with the client application and running on the local computing device, including
accessing the memory using the keyword, wherein the memory stores the keyword in association with entry identifiers of a previous entries memory storing previous entries of the input field or related input fields, wherein the entry identifiers are associated with any of the previous entries containing the keyword, regardless of an order of the keyword within the previous entries,
determining an intersection of the entry identifiers with corresponding entries of the previous entries memory, wherein the corresponding entries include the first previous entry which includes both the keyword and at least a previous keyword in an order in which the previous keyword precedes the keyword;
providing, after the receipt of the input character sequence but before complete reception of the keyword, at least the first previous entry in association with the input field and using the client application;
receiving a selection of the first previous entry for entry thereof into the input field and transmission thereof to a remote server application running on a remote server device; and
transmitting the first previous entry to the remote server application based on the selection.

2. The method of claim 1 wherein receiving an input character sequence of a keyword at an input field comprises:
receiving the input character sequence of the keyword, wherein the keyword appears in a position other than a first position of the first previous entry.

3. The method of claim 1 wherein determining a first previous entry comprises:
determining the input character sequence within any one of at least two ordered positions within each of a subset of a plurality of previous entries, the subset including the first previous entry.

4. The method of claim 1 wherein determining a first previous entry comprises:
determining a plurality of previous entries, the plurality including the first previous entry;
determining at least two of the previous entries that include the input character sequence, and in which the keyword is included in a different ordered position within the at least two previous entries; and
providing the at least two of the previous entries in association with the input field.

5. The method of claim 1 wherein determining a first previous entry comprises:
determining a plurality of previous entries, the plurality including the first previous entry, that include the keyword and the previous keyword, and in which the previous keyword is a first keyword of at least one of the previous entries; and
providing the plurality of previous entries in association with the input field.

6. The method of claim 1 wherein determining a first previous entry comprises:
determining the first previous entry as previously entered at the input field and/or at a different input field.

7. The method of claim 1 wherein the memory is associated with a first database and a second database, and wherein determining a first previous entry comprises:
determining keywords in the first database and associated with identifiers of a plurality of previous entries, the previous entries including the first previous entry; and
selecting the first previous entry from the plurality of previous entries within the second database, in which the previous entries are keyed by the identifiers.

8. The method of claim 1 wherein providing the first previous entry in association with the input field comprises:
re-ordering the first previous entry to present the keyword at a first position.

9. The method of claim 1 wherein providing the first previous entry in association with the input field comprises:
providing a plurality of previous entries in association with the input field; and
sorting, ordering, and/or filtering the previous entries based on a presentation criteria.

10. The method of claim 1 comprising:
wherein the client application includes a browser and the input field is a component of an active web page displayed using the browser, and wherein determining the first previous entry comprises:
accessing a web page model associated with the active web page and the input field, the web page model associated with source code of the active web page and information about previous browser activity; and
accessing the memory by accessing a page preferences memory of the web page model, the page preferences memory storing the first previous entry.

11. The method of claim 1
wherein the receiving the input character sequence, determining the first previous entry, and providing the first previous entry, occur prior to the transmission of the input character sequence, the keyword, or the first previous entry to the remote server.

12. A system executing on a local computing device, the system comprising:
connection logic configured to connect a client application running on the local computing device with a remote server application running on a remote server;
a field history database that, during operation of the client application, stores a plurality of previous entries to at least one input field of the client application; and
a completion list generator executing in association with the client application, that, during operation, receives an input character sequence of a keyword from a current input field and, in response thereto and without transmitting the input character sequence or the keyword to the remote server application, selects a previous entry from the plurality of previous entries stored within the field history database, the previous entry including the keyword after at least one other keyword, wherein the completion list generator, during operation, accesses the field history database using the keyword, wherein the field history database stores the keyword in association with entry identifiers of the plurality of previous entries, wherein the entry identifiers are associated with a subset of the plurality of previous entries containing the keyword, regardless of an order of the keyword within the each of the subset of the plurality of previous entries, wherein the completion list generator, during operation, determines an intersection of the entry identifiers with the subset of the plurality of previous entries, wherein the subset of the plurality of previous entries includes the previous entry, and wherein the completion list generator, during operation, presents, after the receipt of the input character sequence but before complete reception of the keyword, at least the previous entry in a completion list, receives a selection of the previous entry for entry thereof into the input field and, and transmits the previous entry to the remote server application.

13. The system of claim 12 wherein the completion list generator, during operation, re-orders the previous entry within the completion list to include the keyword at a first position of the previous entry and prior to the at least one other keyword.

14. The system of claim 12 comprising:

an input field component including a user interface that, during operation, displays the at least one input field and receives the input data character sequence; and an input field component model associated with the completion list generator and in communication with the input field component to receive the input character sequence and determine the first previous entry.

15. The system of claim 14 wherein the input field component model includes a completion list model that, during operation, receives the input character sequence from a text field model that is in communication with a text field controller of the input field component.

16. The system of claim 15 wherein the completion list model, during operation, provides the previous entry to a completion list view of the input field component, and to receives a selection of the previous entry by way of a completion list controller of the input field component for reporting to the text field model and subsequent inclusion in a text field view of the input field component.

17. The system of claim 14 wherein the client application includes a browser application, and wherein the input field component of the client application is associated with an active web page, and the input field component model is associated with a web page model of the active web page.

18. An apparatus comprising a storage medium having instructions stored thereon, wherein the instructions, when executed on a data processing apparatus, cause the data processing apparatus to:

receive an input character sequence of a keyword at an input field of a client application running on a local computing device;

determine a previous entry from a plurality of previous entries stored in a memory associated with the client application and running on the local computing device, the previous entry including the keyword and at least one previous keyword in an ordered sequence in which the previous keyword precedes the keyword, including accessing the memory using the keyword, wherein the memory stores the keyword in association with entry identifiers of a previous entries memory storing previous entries of the input field or related input fields, wherein the entry identifiers are associated with a subset of the plurality of previous entries containing the keyword, regardless of an order of the keyword within the subset, and determining an intersection of the entry identifiers with the subset of the plurality of previous entries of the previous entries memory, wherein the subset includes the previous entry;

present, after the receipt of the input character sequence but before complete reception of the keyword, a completion list that includes at least the previous entry, using the client application;

receive a selection of the previous entry for entry thereof into the input field and transmission thereof to a remote server application running on a remote server device; and transmit the previous entry to the remote server application based on the selection.

19. The apparatus of claim 18 wherein the previous entry was entered at the input field or at a different input field.

20. The apparatus of claim 18 wherein the instructions, when executed, cause the data processing apparatus to re-order the previous entry to include the keyword at a first position within the previous entry.

\* \* \* \* \*